United States Patent [19]
Davis et al.

[11] Patent Number: 5,857,090
[45] Date of Patent: Jan. 5, 1999

[54] INPUT/OUTPUT SUBSYSTEM HAVING AN INTEGRATED ADVANCED PROGRAMMABLE INTERRUPT CONTROLLER FOR USE IN A PERSONAL COMPUTER

[75] Inventors: Barry R. Davis, Scottsdale, Ariz.; Bruce Young, Tigard, Oreg.

[73] Assignee: Intel Corporation, Santa Clara, Calif.

[21] Appl. No.: 581,162

[22] Filed: Dec. 29, 1995

[51] Int. Cl.[6] ................................................ G06F 13/24
[52] U.S. Cl. ........................ 395/500; 395/739; 395/281
[58] Field of Search ................................. 395/500, 739, 395/733, 281

[56] References Cited

U.S. PATENT DOCUMENTS

| | | | |
|---|---|---|---|
| 5,428,799 | 6/1995 | Woods et al. | 395/739 |
| 5,437,042 | 7/1995 | Culley et al. | 395/848 |
| 5,506,997 | 4/1996 | Maguire et al. | 395/733 |
| 5,555,430 | 9/1996 | Gephardt et al. | 395/733 |
| 5,590,312 | 12/1996 | Marisetty | 395/500 |
| 5,619,705 | 4/1997 | Karnik et al. | 395/739 |
| 5,655,142 | 8/1997 | Gephardt et al. | 395/500 |

*Primary Examiner*—Eddie P. Chan
*Assistant Examiner*—Gary J. Portka
*Attorney, Agent, or Firm*—Blakely, Sokoloff, Taylor & Zafman LLP

[57] ABSTRACT

A computer system is described having one or more host processors, a host chipset and a input/output (I/O) subsystem. The host processors are connected to the host chipset by a host bus. The host chipset is connected to the input/output subsystem by a primary personal computer interface (PCI) bus. The I/O subsystem is connected to I/O devices by a secondary PCI bus. The I/O subsystem includes advanced programmable interrupt controller (APIC) functionality typically provided within an I/O APIC chip within a host chipset. The APIC functionality of the I/O subsystem is primarily implemented in software executing on a core processor of the I/O subsystem. The software creates and accesses various APIC registers and tables, such as a redirection table, within a memory of the I/O subsystem. A single 3-wire APIC bus interconnects the host processors with the I/O subsystem. With this arrangement, non-PCI interrupt lines from the I/O devices are connected only into the I/O subsystem, rather than into the host chipset.

10 Claims, 5 Drawing Sheets

INPUT/OUTPUT SUBSYSTEM HAVING AN INTEGRATED ADVANCED PROGRAMMABLE INTERRUPT CONTROLLER FOR USE IN A PERSONAL COMPUTER

BACKGROUND OF THE INVENTION

1. Field of the Invention

The invention generally relates to computer systems and in particular to computer systems incorporating a personal computer interface (PCI) bus, an input/output (I/O) subsystem and an input/output advanced programmable interrupt controller (APIC).

2. Description of Related Art

Many state of the art personal computer systems employ one or more PCI buses configured in accordance with protocols as established by the PCI special interest group. A PCI bus is a high performance, high bandwidth bus well suited for handling transference of data between a host processor bus and I/O devices such as asynchronous transfer mode (ATM) chips or small computer system interface (SCSI) interface chips.

An example of a computer system configured to incorporate PCI buses is set forth in FIG. 1. More specifically, FIG. 1 illustrates a computer system 10 having set of a host microprocessors 12, a host chipset 14 and an I/O subsystem 16. A primary PCI bus 18 interconnects the host chipset and the input/output subsystem. A secondary PCI bus 20 interconnects the I/O subsystem and a set of I/O devices 22 which may include the aforementioned SCSI chips, ATM chips, or other I/O devices. The host chipset is connected to the host processor by a host bus 24 which, typically, is not a PCI bus. With this arrangement, the host chipset provides a bridge between the host bus and the primary PCI bus. The I/O subsystem provides a bridge between the primary PCI bus and the secondary PCI bus. The I/O subsystem is provided, in part, to handle I/O operations which would otherwise need to be handled by the host processor. The I/O subsystem may include a core processor 26 and a memory 28 to facilitate I/O operations. Exemplary specific components which may be configured in accordance with the architecture of FIG. 1 are Pentium or Pentium Pro host processor chips, Triton or Orion host chipsets and i960 I/O subsystems incorporating one of the 80960 family of I/O co-processor chips. Each of the foregoing are components provided by Intel Corporation, the assignee of rights to the present application, and each component name is a trademark thereof.

By incorporating an I/O subsystem with a processor and memory and by utilizing PCI buses, high speed throughput of data is achieved between the I/O devices and the host chipset. Although such high speed data throughput is useful for many applications, computer systems arranged as in FIG. 1 are particularly useful as file servers. One disadvantage, however, of utilizing PCI buses is that the PCI protocol provides for only four interrupt lines. In FIG. 1, the four PCI interrupt lines are not separately shown but are part of primary bus 18 and secondary PCI bus 20. I/O subsystem 16 includes a PCI interrupt controller 30 which receives the PCI interrupts and routes the interrupts, as needed, into core processor 26 for further processing. For many applications, particularly file server applications, four PCI interrupts is insufficient. To partially remedy this problem, computer system 10 incorporates an I/O APIC 32 within the host chipset and a local APIC unit 34 within each host processor. Additional non-PCI interrupt lines 36 are connected directly from input ports of the I/O devices 22 to the I/O APIC of the host chipset. The I/O APIC of the host chipset communicates directly with the local APICs of the host processors over a dedicated 3-wire APIC bus 38. With this arrangement, interrupt signals generated by the I/O devices are routed directly to the I/O APIC of the host chipset which, in turn, converts the interrupts to APIC standard interupts for routing to the host processors over the APIC bus.

Thus, the use of an I/O APIC within the host chipset allows for additional interrupt signals to be accommodate beyond those provided by the PCI buses. The APIC architecture provides many additional features and advantages, particularly directed towards handling of interrupts within a multi-processor system. APIC is a proprietary interrupt processing technology provided by Intel Corporation. The APIC interrupt architecture is specified within the multiprocessor specification (MPS) document version 1.1 which available from Intel Corporation (Order No. 242016-003).

To handle interrupts, the I/O APIC includes a redirection table, several storage registers and various state machines. The state machine controls storage and processing of values within the redirection table and the various registers. Two of the registers of the I/O APIC, namely an APIC register select register and an APIC window register, are directly accessible by the local APICs of the host processors. Other registers of the I/O APIC are internally accessed by the I/O APIC only. The redirection table, the various registers and the values stored therein, as well as the operations performed by the state machines, are defined by the APIC specification. The redirection table, the registers, the state machines and any other necessary components of the I/O APIC are all formed within a single integrated chip which forms part of the host chipset.

Thus, by employing an APIC architecture, far more interrupts are accommodated than the four interrupts provided with PCI. Moreover, intelligent processing of the interrupts can be performed both within the I/O APIC and within the local APIC. As such, a computer system employing the aforementioned APIC architecture has significant advantages over a system merely using PCI interrupts. However, room for improvement remains. One problem with the arrangement of FIG. 1 is that individual interrupt lines must be connected directly from ports of the I/O devices to the I/O APIC within the motherboard of the computer system. Routing interrupt lines along the motherboard is difficult, particularly for state of the art computer systems wherein components may be required to run at 200 MHz. Another disadvantage of the architecture of FIG. 1 is that the I/O APIC is hard-wired in silicon and is therefore limited in flexibility. Hence, once configured, the I/O APIC cannot merely be reprogrammed to perform additional or different APIC functions. Moreover, because the I/O APIC is configured in silicon, there are significant practical constraints on the size of the redirection table incorporated therein. As a result, practical systems incorporating an I/O APIC often include a relatively small redirection table which lacks flexibility otherwise available with a larger redirection table.

In view of the foregoing, it would desirable to provide an improved APIC architecture, particularly one which does not require interrupt lines to be physically connected to the host chipset from the I/O device ports and which does not have the physical and practical limitations imposed by a hard-wired I/O APIC system.

SUMMARY OF THE INVENTION

In accordance with one aspect of the invention, an improved APIC architecture is provided wherein I/O APIC functions are emulated in software running within the core processor of an I/O subsystem. In other words, rather than providing an integrated circuit I/O APIC as part of the host chipset and routing interrupt signals from I/O device ports to the host chipset, interrupt lines are connected directly from the I/O device ports to the I/O subsystem which emulates an I/O APIC. A 3-wired APIC bus is connected directly from the I/O subsystem to the host processors.

In one exemplary embodiment, the foregoing is implemented within the computer system having a host processor containing a local APIC and a host chipset connected to the host processor by a host bus. An I/O subsystem is connected to the host chipset by a primary PCI bus and is connected to the local APIC of the host processor by an APIC bus. Means are provided within the I/O subsystem for receiving interrupt signals from I/O devices, for emulating APIC functionality, and for communicating with the local APIC of the host processor over the local APIC bus. The means for emulating the APIC functionality may be a core processor running an APIC emulation program and utilizing random access memory to configure a redirection table and utilizing a pair of registers within a messaging unit for implementing an APIC register select register and an APIC window register.

Within the exemplary embodiment, a single interrupt controller is provided within the core processor of the I/O subsystem for receiving either PCI interrupts or APIC interrupts thereby allowing dual use of interrupt pins. Moreover, a set of multiplexers are connected between the interrupt pins and the interrupt controller for selectively directing interrupts either to the interrupt controller or directly onto interrupt lines of the primary PCI bus. With this multiplexer arrangement, PCI interrupts may be routed directly to the primary PCI bus or maybe routed into the interrupt controller for further processing within the core processor of the I/O subsystem. The multiplexer directs all APIC interrupts into the interrupt controller for processing the APIC emulation software within the core processor. Thereafter, the core processor utilizes an APIC bus interface unit, which is connected to the APIC bus, for forwarding the APIC interrupts to the host processors of the computer system.

With this arrangement, APIC functionality is integrated into the I/O subsystem thereby eliminating the need to route numerous individual interrupt lines to the host chipset. Moreover, by integrating APIC functionality within the I/O subsystem, interupt processing intelligence is added at the lowest level of the interrupt structure to perform the most amount of work where it is required, i.e., within the I/O subsystem itself. By utilizing interrupt pins to handle both PCI interrupts and APIC interrupts, a considerable savings in pin count is achieved along with savings in package real state and silicon. The dual use of processor interrupts also allows for the aforementioned programmable routing of interrupt signals. By using a portion of the I/O subsystem memory to represent the redirection table, a substantially larger redirection table can be defined than is practical within a hard-wired silicon redirection table as required with previous APIC configurations. The larger redirection table allows for greater flexibility in tracking and redirecting interrupt signals. Since many I/O subsystems already employ or require memories, the APIC redirection table is implemented without a significant increase in required resources. Various APIC registers are also mapped into the I/O subsystem memory thereby saving further silicon real state. Only the aforementioned APIC register select register and APIC window register, which are defined by the APIC architect specification to be directly accessible by host processors over the APIC bus, need to be configured as actual physical registers. As noted, these registers are implemented within a messaging unit which is normally provided within state of the art I/O subsystems of computers employing APIC.

Thus, significant advantages are achieved without requiring additional resources. Indeed, resources which would otherwise need to be provided within the host chipset can be eliminated therefrom, including the entire I/O APIC IC.

DETAILED DESCRIPTION OF EXEMPLARY EMBODIMENTS OF THE INVENTION

With reference to the remaining figures, exemplary embodiments of the invention will now be described. The exemplary embodiments are described primarily with reference to block diagrams illustrating apparatus elements. Unless otherwise noted and depending upon the implementation, the apparatus elements, or portions thereof, may be configured in hardware, software, firmware or combinations thereof. It should be appreciated that not all components necessary for a complete implementation of a practical system are illustrated or described in detail. Rather, only those components necessary for a thorough understanding of the invention are illustrated and described. Furthermore, components which are either conventional or may be readily designed and fabricated in accordance with the teachings provided herein are not described in detail.

Figure 2:
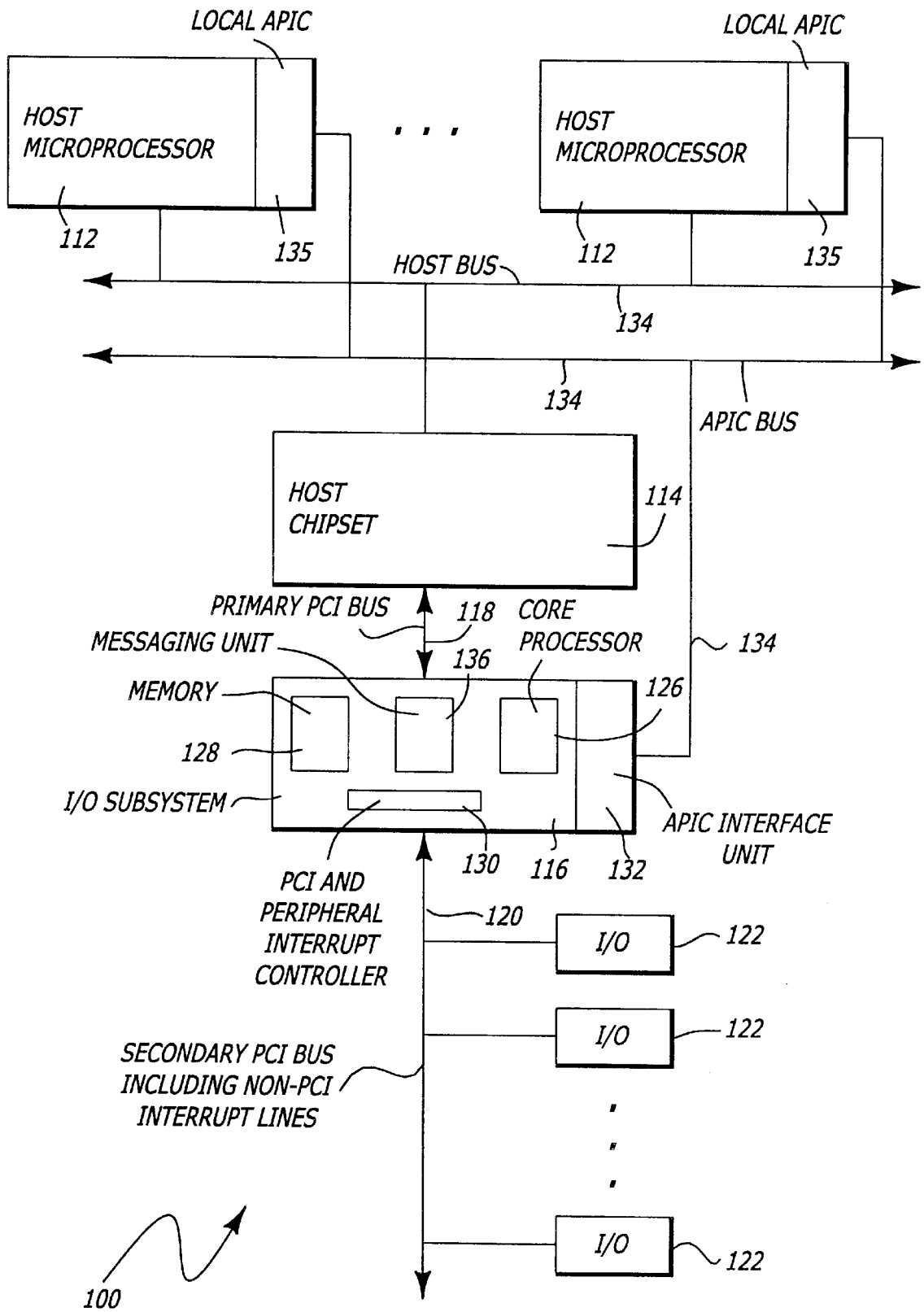
FIG. 2 is a block diagram of a computer system having I/O APIC functionality integrated within an I/O subsystem and partially emulated by software therein, in accordance with an exemplary embodiment of the invention.

FIG. 2 illustrates a computer system 100 having a set of host processors, generally denoted 112, a host chipset 114 and an I/O subsystem 116. A primary PCI bus 118 interconnects the host chipset and the I/O subsystem. A secondary PCI bus 120 interconnects the I/O subsystem with I/O ports 122 of I/O devices. The host microprocessors are interconnected to the host chipset by a host bus 124. Although not separately shown, additional devices may be connected to the host bus. For example, an additional host chipset in combination with an additional I/O subsystem and additional PCI buses may be provided. A cluster attachment may also be connected to the host bus to allow for additional microprocessors to be interconnected in a multi-processing arrangement.

I/O subsystem 116 includes, as principal components, a core processor 126, a memory 128, a PCI and peripheral interrupt controller 130 and an APIC bus interface unit 132. The APIC bus interface unit of the I/O subsystem is connected by a 3-wire APIC bus 134 to local APIC units of each of the host processors. I/O subsystem 116 also includes a messaging unit 136 which facilitates transmission of data between the PCI buses to the core processor 126. As will be described below, messaging unit 136 also includes two host-visible APIC registers—an APIC register select register and an APIC window register within the messaging unit.

PCI and peripheral interrupt controller 130 receives PCI interrupts and non-PCI interrupts and routes the interrupts, in a manner to be described below, either to core processor 126 or to primary PCI bus 118. Core processor 126 runs software configured to emulate APIC functionality. The software emulates APIC functions that would otherwise be performed by a separate I/O APIC chip within the host chipset. In this regard, the emulation software creates and accesses all non-host-visible APIC registers and a redirection table within memory 128 and accesses the host-visible registers the messaging unit. The APIC emulation software forwards non-PCI interrupts to the APIC bus through APIC bus interface unit 132 as APIC interupts. Likewise, the emulation software receives responsive end of interrupt (EOI) signals from host processors over the APIC bus for routing to the individual I/O devices connected to the I/O ports.

Thus, FIG. 2 illustrates a computer system wherein APIC functionality is integrated within an I/O subsystem rather than provided as a separate chip within a host chipset. APIC integration is achieved, in part, by the emulation software running within the core processor and by the registers and tables of the messaging unit and the memory. The manner by which APIC emulation is achieved will be described in more detail with reference to the remaining figures.

Figure 3:
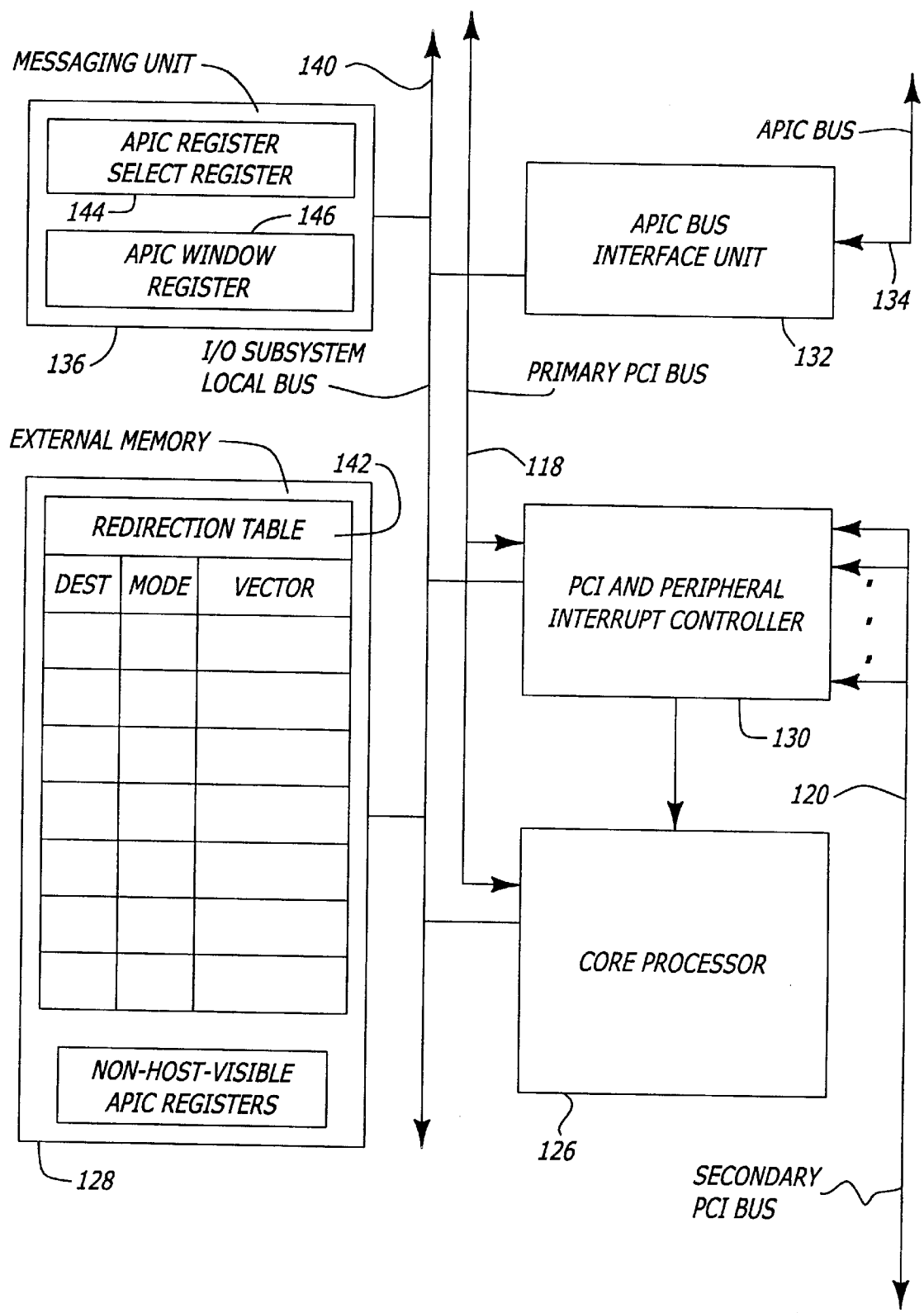
FIG. 3 is a block diagram of selected internal components of the I/O subsystem of FIG. 2.

FIG. 3 illustrates, in block diagram form, primary components of the I/O subsystem configured for APIC emulation. More specifically, FIG. 3 illustrates the aforementioned core processor 126, APIC bus interface unit 132, PCI and peripheral interrupt controller 130, memory 128 and messaging unit 136. These components are interconnected by an I/O subsystem local bus 140. Memory 128 is configured to include a redirection table 142 having, for each of a number of interrupt entries, a destination value, a mode value and a vector value. Memory 128 is also employed to store values corresponding to all APIC registers other than the APIC register select register and the APIC window register which must be accessible to the local APICs of the host processors over the 3-wire APIC bus. Messaging unit 136 includes an APIC register select register 144 and an APIC window register 146.

Interrupt signals, including both PCI and non-PCI interrupts, are received from external I/O devices either along the secondary PCI bus (FIG. 2) or along separate interrupt lines by the PCI and peripheral interrupt controller. Controller 130 routes all non-PCI interrupts directly to core processor 126. Core processor 126 processes the non-PCI interrupts in accordance with APIC processing protocols and forwards the APIC interrupts, as needed, over the local bus to the APIC bus interface unit for further transmission onto to the APIC bus. In this regard, the core processor accesses the registers and the redirection table of memory 128 and the registers of messaging unit 136. In general, the manner by which the registers and the redirection table are accessed and utilized may be the same with conventional APIC architectures other than any modifications necessary to accommodate access via a local bus rather than direct access as with a separate I/O APIC integrated circuit. Additional details may be found within Appendix A entitled "APIC Bus Interface Unit" which is attached hereto and incorporated by reference herein. Additional details of the overall operation of the I/O subsystem may be found within a patent application entitled, "Architecture for an I/O Processor that Integrates a PCI to PCI Bridge," filed Jun. 5, 1997, having Ser. No. 08/870,141, which is a continuation of application filed Jun. 15, 1995, having Ser. No. 08/490,654, now abandoned, and assigned to the assignee of the rights of the present application. The aforementioned patent application is also incorporated by reference herein. Both Appendix A and the above-referenced patent application describe a specific implementation of the I/O subsystem identified as the i960(R) P2P microprocessor which incorporates an Intel 80960JF processor as the core processor of the I/O subsystem. However, principles of the invention may be incorporated in other computer systems incorporating other specific I/O subsystem components and sub-components.

Thus, non-PCI interrupts are routed into the core processor, then ultimately rerouted, if necessary, onto the APIC bus for processing by the host processors. (Many of the non-PIC interrupts may be processed by the core processor without requiring forwarding to the host processors. In general, only those non-PCI interrupts requiring processing by the host processors will be forwarded on the PIC bus.) PCI interrupts, on the other hand, received by the PCI and peripheral interrupt controller are either directed to core processor 126 or are retransmitted directly onto primary PCI bus 118. If processed by core processor 126, the PCI interrupts may either be retransmitted onto primary bus 118 or, if desirable, processed internally by the core processor without requiring transmission onto the primary PCI bus. The manner by which both PCI and non-PCI interrupts are processed by the core is further described in the above-referenced patent application and within Appendix A.

Thus, FIG. 3 illustrates one exemplary implementation wherein APIC functionality may be emulated within an I/O subsystem. Important features of the exemplary implementation include the use of memory to represent an I/O redirection table. By using memory, rather than integrated circuit registers, the redirection table may be made as large as desired affording considerably greater flexibility than can be achieved in hard-wired redirection tables. Likewise, by emulating APIC functionality with the software, rather than using hard-wired state machines and the like, considerable processing flexibility is achieved. Software can be modified and updated to incorporate additional functionality without requiring design of a new APIC integrated circuit chip. Moreover, the APIC emulation software may be designed to perform far more functions than could be performed within a practical integrated circuit implementation subject to significant physical and cost constraints. The foregoing is achieved without requiring additional significant I/O subsystem resources. As noted above in the Description of Related Art section, many conventional state of the art I/O systems already incorporate a core processor, memory, and the like.

As to the emulation software for running within the core processor, the actual design and configuration of such software depends upon the specific hardware employed within the I/O subsystem including the core processor hardware, the messaging unit hardware and the memory hardware. Those of ordinary skill in the art, given the description provided herein and the APIC specifications set forth in the above-referenced documents, can develop appropriate software for use with a suitable hardware components for emulating APIC functionality.

Figure 4:
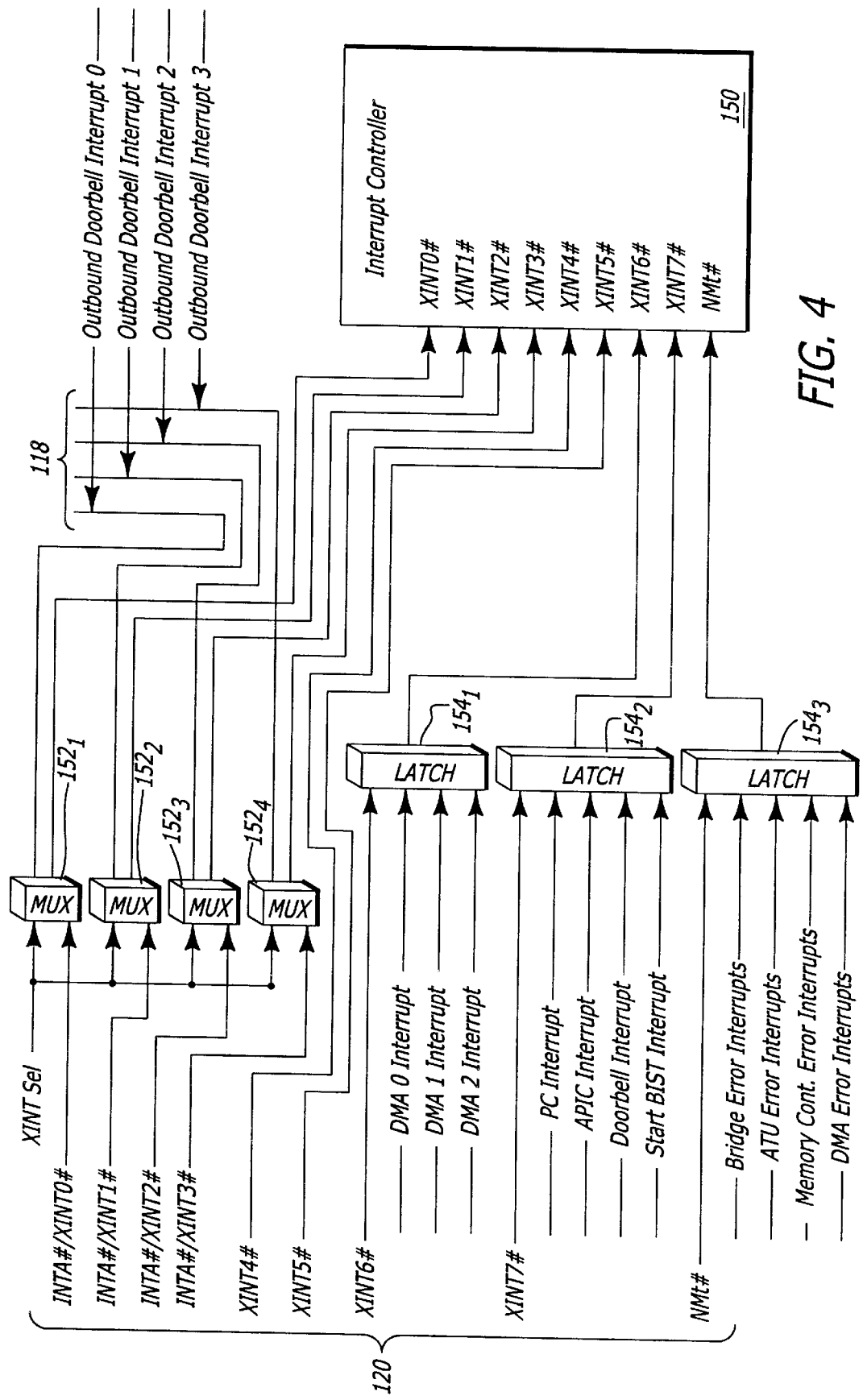
FIG. 4 is a block diagram illustrating a PCI and peripheral interrupt controller of FIG. 3.

FIG. 4 illustrates an example of one possible implementation of the PCI and peripheral interrupt controller. More specifically, FIG. 4 illustrates an interrupt controller 150 (which may form the portion of the core processor of FIG. 3), a set of interrupt redirection multiplexers $152_1$–$152_4$ and a set of interrupt input latches $154_1$–$154_2$. Interrupt controller 150 includes nine inputs corresponding to eight interrupt inputs (XINT0–XINT7) and one NMI interrupt. Outputs of latches $154_1$, $154_2$, and $154_3$ are connected, respectively, to controller inputs MNT6, XINT7 and NMI. Inputs to the latches include, as shown in FIG. 4, non-PCI interrupt signals INT6, INT7 and NMI as well as various DMA interrupts, doorbell interrupts, bridge area interrupts and the like. Each of the latches includes a binary value (not separately shown) which identifies the origin of the interrupt signal held therein. The additional interrupts (i.e., those interrupts other than PCI interrupts INTA–INTD and the non-PCI interrupts INT0–INT7) are not pertinent to the present invention and will not be further described.

Each of multiplexers 152 is connected to a single corresponding input pin for receiving a PCI interrupt (i.e., INTA–INTD) or a non-PCI interrupt (i.e., XINT0–XINT3). Outputs of multiplexers $152_1$–$152_4$ are connected, respectively, to inputs XINT0–XINT3 of controller 150. A second output of each of multiplexers 152 are connected to interrupt lines of the primary PCI bus. With this arrangement, input signals received by the multiplexers may be directed either onto the primary PCI bus or into the interrupt controller. Selection is achieved using an XINT select signal which is generated by the core processor. In use, non-PCI interrupts are always directed into the core processor to the interrupt controller for processing therein, perhaps as APIC interrupts. PCI interrupts may either be directed onto the primary PCI bus or directed into the core processor for processing therein.

With this arrangement, both PCI and non-PCI interrupts are accommodated without requiring a separate input pin for each interrupt. The use of multiplexers allows greater flexibility and routing PCI interrupt signals. Of course, other arrangements may be provided for receiving and routing interrupt signals within the I/O subsystem and the embodiment of FIG. 4 is merely one example.

Figure 5:
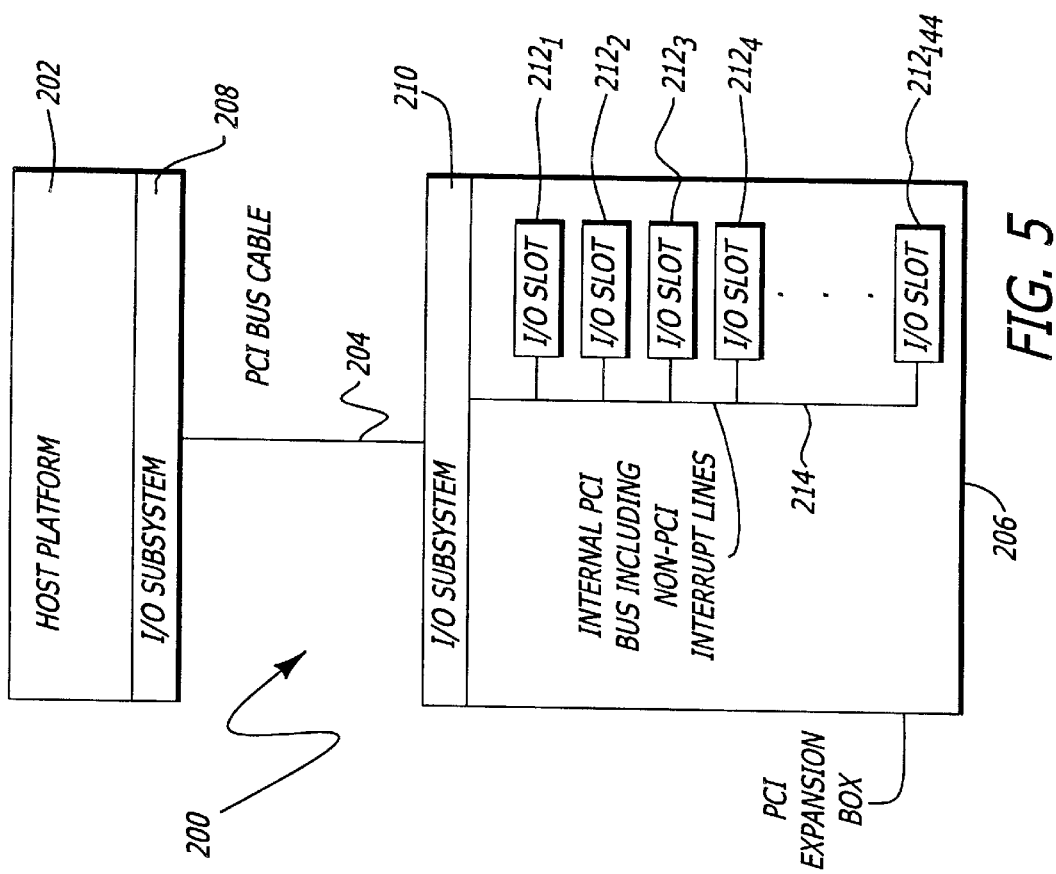
FIG. 5 is a block diagram of a computer system having a host platform connected to a PCI expansion box by a PCI cable connection line wherin APIC interupts are trasnmitted over the PCI cable as encoded PCI data signals.

As thus far described, the integrated APIC architecture of the present invention allows multiple interrupt signals to be received and processed by a single I/O subsystem then forwarded to host computers over a single 3-wire APIC bus. The elimination of the need to route separate interrupt lines for each separate non-PCI interrupt to a host chipset is a significant advantage. One implementation exploiting this advantage is illustrated in FIG. 5. More specifically, FIG. 5 illustrates a computer system 200 having a host platform 202 connected by a cable 204 to a PCI expansion box 206. The host platform 202 includes components illustrated in FIG. 3 including one or more host processors, a host chipset and a I/O subsystem. Within FIG. 5, only I/O subsystem 208 of host platform 202 is illustrated. PCI expansion box 206 also includes an I/O subsystem 210. Expansion box 206 includes individual I/O device connection slots 212 all interconnected to an internal PCI bus 214. In exemplary embodiments, as many as 144, or more, slots may be provided. Bus 214 also includes non-PCI interrupt lines connecting each of the interrupt slots to I/O subsystem 210.

I/O subsystem 210 includes an integrated APIC emulation arrangement, such as set forth in FIG. 3, wherein non-PCI interrupts are received and converted to APIC interrupts. Emulation software within I/O subsystem 210, however, also converts or encodes the APIC interrupts to PCI data signals for transmission over PCI bus 204. I/O subsystem 208 incorporates APIC emulation software which detects the encoded APIC interrupts, extracts the interrupts from the PCI data signals, and recreates APIC interrupt signals for transmitting over an internal 3-wire APIC bus (not separately shown) to host processors of the host platform 202. Thus, with this arrangement, non-PCI interrupts generated by the I/O devices are received by I/O subsystem 210, converted to PCI data packets and transmitted over PCI bus 204, then reconverted to interrupt signals by I/O subsystem 208. Without such an arrangement, the expansion box of FIG. 5 would not likely be feasible. Either separate interrupt lines for each of the input/output ports would need to be separately routed into the host platform or the I/O devices would need to rely on only the four dedicated PCI interrupt lines. Neither is a practical option, particularly for a PCI expansion box having up to 144 expansion slots. Although not separately shown in FIG. 5, to accommodate a 144 expansion slots, PCI expansion box 206 may require a number of PCI buses interconnected in a hierarchical arrangement through a number of PCI to PCI bridges such as I/O subsystem 210. For clarity in FIG. 5, only a single internal PCI bus is illustrated in connection with only a single I/O subsystem.

Figure 6:
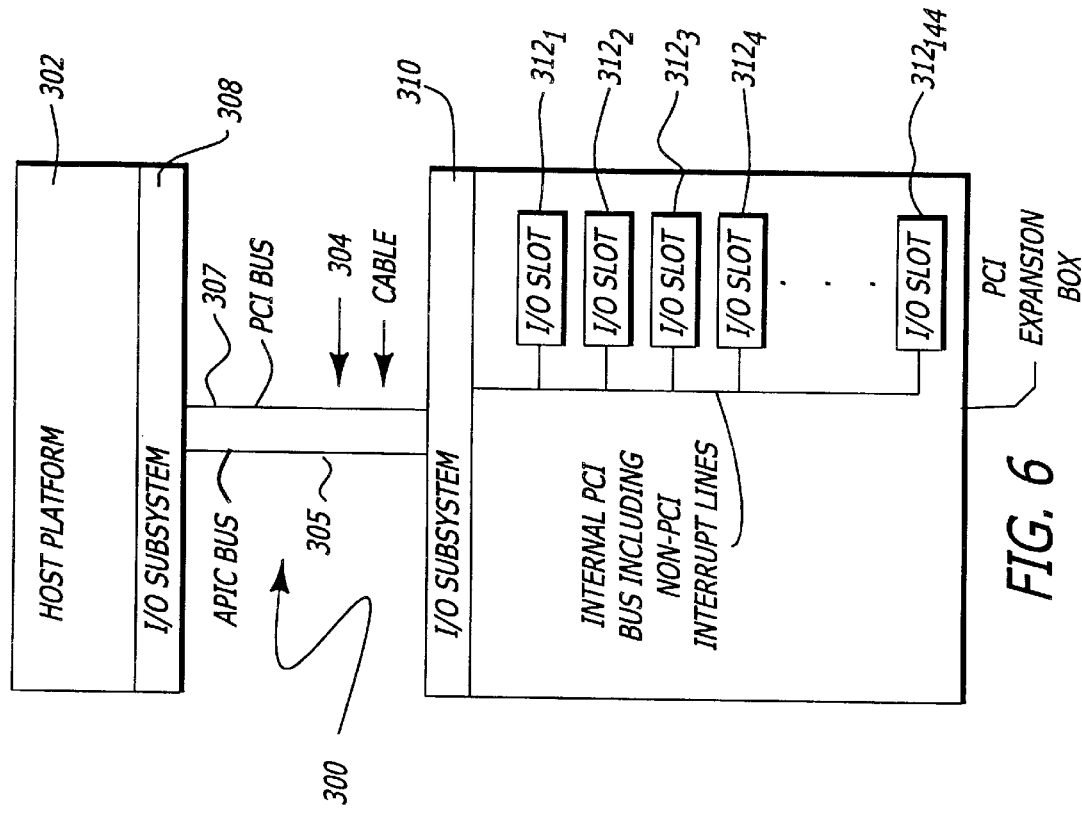
FIG. 6 is a block diagram of a computer system having a host platform connected to a PCI expansion box by a PCI cable connection line having separate APIC connection lines.

An alternative arrangement, illustrated in FIG. 6, provides a 3-wire APIC bus along with the PCI cable. The embodiment of FIG. 6 is similar to that of FIG. 5 with like components represented by like reference numerals incremented by 100. Only pertinent differences will be described. Cable 304 includes a 3-wire APIC bus 305 in addition to a PCI bus 307. APIC emulation software within subsystem 210 receives non-PCI interrupts from the I/O slots and converts those interrupts to APIC interrupts for forwarding over APIC bus 305 of cable 304. As such, the APIC interrupts need not be encoded as PCI data. Within the host platform, the 3-wire APIC bus may be directly connected into local APICs of host processors (not separately shown) or may be connected into an I/O subsystem of the type illustrated above in FIG. 3. Other arrangements for transmitting APIC interrupts from the PCI expansion box to the host platform may be provided in a manner consistent with the principles of the invention.

What has been described is a computer system having APIC functionality integrated within an I/O subsystem rather than having a separate I/O APIC chip formed as portion of a host chipset. The integrated APIC architecture has been described with reference to specific exemplary embodiments. These embodiments are provided to merely illustrate the principles of the invention and should not be construed as limiting the scope of the invention.

Docket No. 042390.P3271

APPENDIX A

CHAPTER 14
APIC BUS INTERFACE UNIT

This chapter describes the APIC Bus Interface Unit which provides a mechanism for communication between the local bus and the 3-wire APIC bus. It provides two basic functions:

- It gives the 80960 JF processor the ability to send an interrupt message out onto the APIC bus and optionally be interrupted when the message has been sent. The 80960 JF processor can then read the resulting status of the message transmission to check for errors.

- It can also receive EOI messages from the APIC bus and optionally interrupt the 80960 JF processor to inform it that an EOI vector is available.

The operation modes, setup and implementation of the interface are detailed in this chapter.

14.1 APIC ARCHITECTURE OVERVIEW

The APIC interrupt architecture is specified as the interrupt architecture for all Multiprocessor Specification[1] (MPS) compatible systems. The main features of the APIC architecture are:

1. APIC provides multiprocessor interrupt management for Intel Architecture CPUs such as the 90 & 100 MHz Pentium™ Processors, providing both static and dynamic symmetric interrupt distribution across all processors.

2. Dynamic interrupt distribution includes routing of the interrupt to the lowest-priority processor.

3. APIC works in systems with multiple I/O subsystems, where each subsystem can have its own set of interrupts.

4. APIC provides inter-processor interrupts, allowing any processor to interrupt any processor or set of processors, including itself.

5. Each APIC Interrupt Input pin is individually programmable by software as either edge or level triggered. The interrupt vector and interrupt steering information can be specified per pin.

6. APIC supports a naming/addressing scheme that can be tailored by software to fit a variety of system architecture's and usage models.

7. APIC supports system-wide processor control functions related to NMI, INIT, and System Management Interrupt (SMI).

8. APIC co-exists with the 8259A PIC to maintain PC compatibility.

9. APIC provides programmable interrupt priority (vectors) for each interrupt Input Pin. Since the APIC programming interface consists of two 32-bit memory locations, I/O APIC functionality can be emulated by the 80960 JF processor in the P2P processor.

Structurally, the APIC partitions into two portions:
- one residing in the I/O Subsystem
- one residing in the Host CPU

---

1. MultiProcessor Specification Version 1.1, September 1994, Order Number 242016-003

APIC BUS INTERFACE U. 

Figure 1:
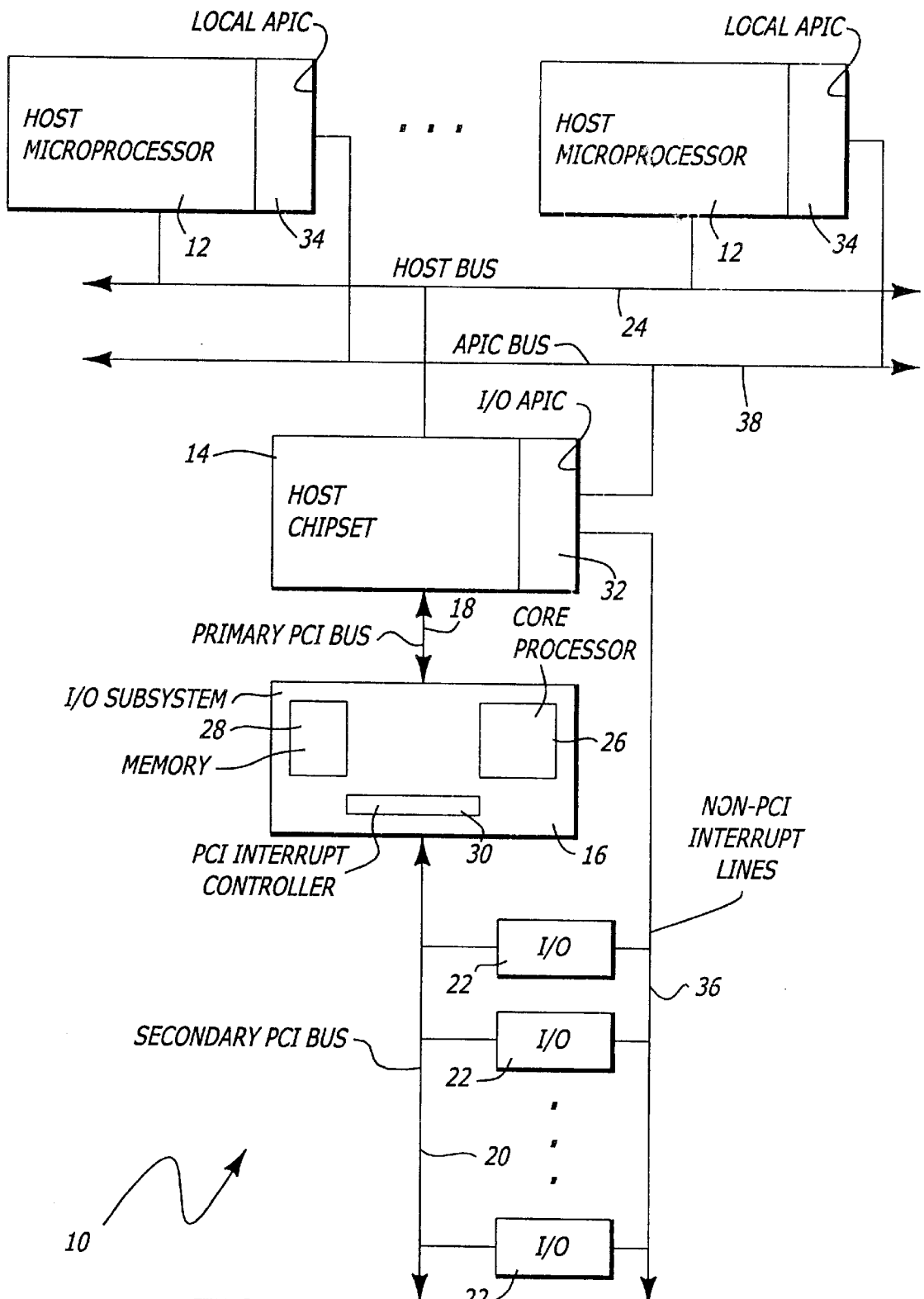
FIG. 1 is a block diagram of a computer system incorporating an I/O APIC within a host chipset and configured in accordance with the prior art.

This is shown in Figure 14-1. The portion that resides in the I/O subsystem is known as I/O APIC Unit or I/O APIC and the portion that resides in the CPU is known as Local APIC Unit or Local APIC. The local APIC and the I/O APIC communicate over a dedicated APIC bus.

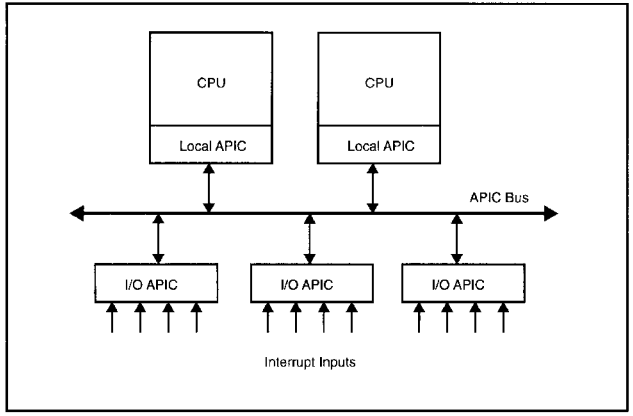

Figure 14-1. I/O and Local APIC Units

The I/O APIC Unit provides the interrupt input pins on which I/O devices inject interrupts into the system in the form of an edge or a level. The I/O APIC also contains a Redirection Table with an entry for each interrupt input pin. Each entry in the Redirection Table can be individually programmed to indicate whether an interrupt on the pin is recognized as either an edge or a level; what vector and also what priority the interrupt has; and which of all possible processors should service the interrupt and how to select that processor (statically or dynamically). The information in the table is used to broadcast a message to all Local APIC units.

The Local APIC Unit contains the necessary intelligence to determine whether or not its processor should accept interrupts broadcast on the APIC bus. The Local APIC also provides local pending of interrupts, nesting and masking of interrupts, and handles all interactions with its local processor such as the INTR/INTA/EOI protocol. The Local APIC further provides inter-processor interrupts and a timer, to its local processor. The register level interface of a processor to its local APIC is identical for every processor. For more details on APIC architecture refer to APIC EAS SPECIFICATION 4.0.

14.2  APIC EMULATION BY THE P2P PROCESSOR

While it is not the intent of this chapter to fully describe how an APIC would be emulated by a P2P processor, enough details are given here to provide a basic understanding of how it can be done.

The I/O APIC Unit consists of:

- Set of Interrupt Input pins
- Interrupt Redirection Table
- APIC Bus Interface Unit for sending and receiving APIC messages from the APIC bus When using the P2P processor, the Interrupt Redirection table is stored in local memory and overall control of the I/O APIC is handled by emulation software executing on the 80960 JF processor. The Interrupt Input pins are either just the P2P processor interrupt pins or are expanded through external hardware feeding into the 80960 JF processor inter-

APIC BUS INTERFACE UNIT rupt controller. The APIC Bus Interface is a dedicated hardware unit in the P2P processor and acts as an interface from the 80960 local bus to the APIC bus.

When the 80960 JF processor receives an interrupt that it determines should be sent as an APIC message, the emulation software looks up the information related to that interrupt in the Interrupt Redirection Table stored in local memory and writes that information to the APIC Bus Interface Unit which then sends the correct message on the APIC bus. The content of the Redirection Table is under software control and defaults to a disabled state upon reset. The block diagram in Figure 14-2 shows how an I/O APIC Unit can be emulated in a P2P processor.

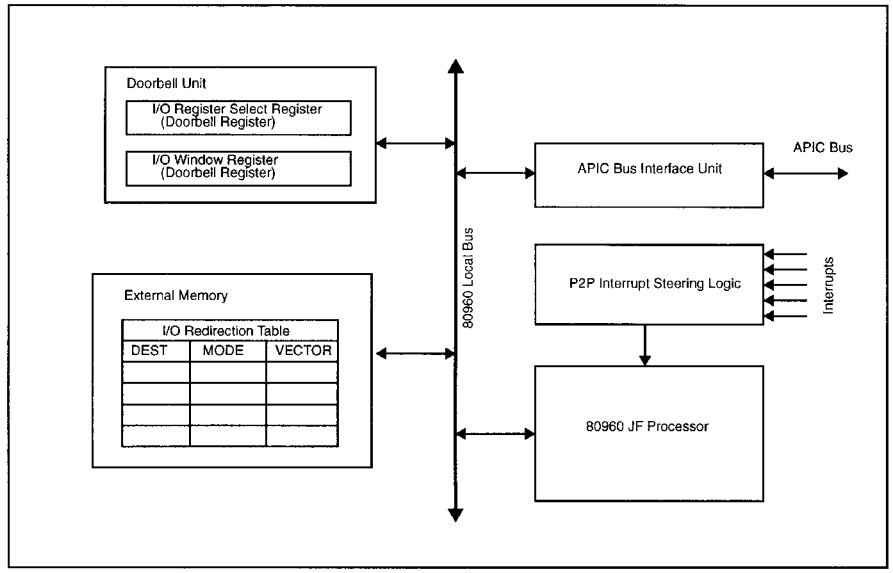

Figure 14-2. I/O APIC Block Diagram

The I/O Register Select Register and I/O Window Register are the only registers directly visible to the host software in the APIC architecture. Each can be emulated by using the Doorbell registers. All other APIC registers are accessed through these two registers.

When the I/O Register Select Register is written, a doorbell interrupt is asserted to the 80960 JF processor and locks out all other doorbell addresses. The emulation software then reads the logical APIC register at the offset contained in the I/O Register Select Register (as defined by the APIC Architecture - not the local bus address mapping) and stores the value back into the I/O Window Register. It then releases the doorbell interlock mechanism to allow additional accesses to the doorbell address space. The emulation software also must keep the value of the I/O Window register updated if the redirection table is changed due to interrupt activity.

When the I/O Window register is written, the doorbell interrupt is asserted to the 80960 JF processor and all other doorbell accesses are locked out. The emulation software reads the values of the I/O Register Select Register and I/O Window Register, updates the appropriate register and releases the doorbell interlock.

APIC BUS INTERFACE U. 

14.2.1 Using the APIC Bus Interface

Host software interacts with the I/O APIC by reading and writing the registers described in the APIC Architecture. All registers are accessed through the I/O Register Select Register and the I/O Window Registers as described in the previous section. These two registers are implemented in interlocked Doorbell registers in the P2P processor and do not require dedicated registers. The I/O Redirection Table Entries are stored in RAM. The Version Register is a read only register so its data can be stored in the 80960 JF processor's emulation code (probably in EPROM). The only other host software visible registers in the APIC architecture are the I/O APIC ID Register and the I/O APIC Arbitration Register. These are both implemented in the APIC Bus Interface Unit of the P2P processor. In addition to these two architecturally defined registers, the APIC Bus Interface Unit implements 3 other registers which are used by the 80960 JF processor to communicate with the unit. These are the Interrupt Message Register (IMR), the EOI Vector Register (EVR) and an APIC Control/Status Register (APIC CSR). All five registers map into local bus memory addresses and are described in detail later in this chapter.

14.2.1.1 I/O APIC Initialization

The APIC Bus Interface Unit is reset at the same time as the 80960 JF processor. The state of registers and state machines after a reset is defined by the APIC Architecture. Since the 80960 JF processor is emulating the I/O APIC function, it is responsible for setting the registers to the proper values at reset. The reset definitions are as follows:

- I/O APIC ID Register, I/O Arbitration ID Register, I/O Register Select Register and I/O Window Register are reset to 0
- I/O Redirection Table Entries are reset to zero except for the Mask bits. The Mask bits are set to ones.
- All internal state machines are reset. This includes both the hardware state machines in the APIC Bus Interface Unit and software state machines in the APIC emulation code.

Because of the way that the APIC bus arbitration is performed, it is important that all APIC bus interfaces be synchronized before multiple agents are allowed to attempt to send messages on the APIC bus. This is done using the "De-assert INIT" message which causes the APIC Arbitration register to be loaded with the value in the APIC ID Register (done by hardware in the APIC Bus Interface Unit). While the hardware will allow the P2P processor to send this message, in general, the synchronization should be done by the host processor after any PCI bus reset.

14.2.1.2 Sending Interrupt Messages

The APIC Bus Interface can send but not receive APIC interrupt messages. Before sending a message, the APIC CSR should be read and the Send Message and Message Sent bits checked to insure that the APIC Bus Interface is done sending the previous message and available for use. Table 14-1 shows the meaning of those bits.

Table 14-1. APIC CSR Send State Bits

| Send Message | Message Sent | APIC Bus Interface State |
|---|---|---|
| 0 | X | APIC Send Unit Idle |
| 1 | 0 | Unit Attempting to Send Message |
| 1 | 1 | Unit has sent Message, Status is Valid |

To send a message, the appropriate information is written to the IMR. The APIC CSR is then written to tell the APIC Bus Interface Unit to attempt to acquire the bus and send the message. The Send Message bit and the Message Sent bit should both be written with a '1' to set the Send Message bit and clear the Message Sent bit. The Message Sent Interrupt Enable bit can be set if an 80960 JF processor interrupt upon completion is desired. After the message has

APIC BUS INTERFACE UNIT been sent one time on the APIC bus, the Message Sent bit is set and the APIC Bus Interface Unit stops trying to send the message (even if an error or retry is received on the APIC bus). If the 80960 JF processor interrupt is enabled, that interrupt will be generated as well. The interrupt condition is cleared by resetting the Message Sent bit in the APIC CSR.

The Status bits in the APIC CSR will be set with the Status received from the APIC bus each time a message is sent. Table 14-2 shows the meaning of the status bits which is dependent on the type of message that was being sent. The shaded entries are the cases where the message was successfully sent. All other status values indicate that the message was not received by a Local APIC and should be sent again to insure that the interrupt is processed by a host CPU.

If the Send Message bit is reset before the Message Sent bit is set, effectively aborting the interrupt message, it is indeterminate whether the message will actually be sent or not because the APIC Bus Interface Unit might be in the middle of sending the message. To ensure that no invalid messages are sent, the emulation software should wait for at least 30 APIC clocks (1.8 μs at 16 MHz) before attempting to write a new value to the IMR after aborting the previous message.

Table 14-2. APIC Bus Message Status Information Definition

| Delivery Mode | Focus Processor? | Status: A A | Comments | Status: A1 A1 | Comments |
|---|---|---|---|---|---|
| Fixed, EOI | N/A | 00 | CS is OK | 10 | Accepted |
| | | | | 11 | Retry |
| | | | | 0X | Error |
| | | 11 | CS Error | XX | |
| | | 10 | Error | XX | |
| | | 01 | Error | XX | |
| NMI, SMI, Reset, ExtINT | N/A | 00 | CS is OK | 10 | Accepted |
| | | | | 11 | Error |
| | | | | 0X | Error |
| | | 11 | CS Error | XX | |
| | | 10 | Error | XX | |
| | | 01 | Error | XX | |
| Lowest Priority. | No | 00 | Checksum OK no Focus Proc. | 11 | Go for Lowest Priority Arbitration Status A2: 10: Accept 11, 0X: Error |
| | | | | 10 | End and Retry |
| | | | | 0X | Error |
| | Yes | 10 | Checksum OK w/ Focus Proc. | XX | |
| | | 11 | Checksum Error | XX | |
| | | 01 | Error | XX | |
| Remote Read | N/A | 00 | Checksum OK | XX | |
| | | 11 | Checksum Err. | XX | |
| | | 01 | Error | XX | |
| | | 10 | Error | XX | |

APIC BUS INTERFACE UN 

14.2.1.3 Receiving EOI Messages

Whenever an EOI message is detected on the APIC bus, the APIC Bus interface will either accept the EOI or retry it depending on the state of the EOI Received and EOI Flow Control bits in the APIC CSR register. Table 14-3 shows the action taken upon receipt of an EOI message.

Table 14-3. APIC CSR EOI State Bits

| EOI Received | EOI Flow Control | APIC Bus Interface Unit Action upon receipt of an EOI message |
|---|---|---|
| X | 0 | Unit accepts EOI message |
| 0 | 1 | Unit accepts EOI message |
| 1 | 1 | Unit retries incoming EOI message |

If the EOI is accepted, the EOI vector is written into the EVR and the EOI Received bit is set. If the EOI Interrupt Enable bit is set, the 80960 JF processor is interrupted. The EOI Received bit must be cleared to remove the interrupt.

If the EOI Flow Control bit and the EOI Received bit are both set when an EOI is received, the APIC bus interface causes a retry on the APIC bus by driving the Status1 bits to a value of '11' (asserted). The EVR is not changed when the EOI message is retried. This gives the 80960 JF processor time to process the previous EOI so that no messages are lost.

If the EOI messages are not being used or the APIC is disabled, the EOI Flow Control bit should be cleared to insure that the P2P processor does not lock up the APIC bus by retrying all EOI messages.

14.3 REGISTER DEFINITIONS

The APIC Bus Interface Unit implements 5 registers that are mapped into local bus memory address space:

- APIC ID Register - APIC ID
- APIC Arbitration ID Register - APIC ArbID
- EOI Vector Register - EVR
- Interrupt Message Register - IMR
- APIC Control Status Register - APIC CSR See Chapter 12 for details of where these registers are mapped.

14.3.1 APIC ID Register - APIC ID

Each APIC Unit has a register that contains the Unit's APIC ID. The ID serves as a physical name of the APIC Unit. All APIC units using the APIC bus must have a unique four bit APIC ID. The APIC bus arbitration ID for the I/O unit is derived from its APIC ID. The APIC architecture allows for an 8 bit APIC ID but the APIC Bus is limited to 4 bits by its arbitration scheme. The APIC ID is read-write by software and must be programmed to a valid ID value before the APIC bus is used for message transmission.

.PIC BUS INTERFACE UNIT

Table 14-4. APIC ID Register - APIC ID

| Bit | Default | Read/Write | Description |
|---|---|---|---|
| 31:04 | 0000000H | Read Only | Reserved |
| 03:00 | 0000$_2$ | Read/Write | APIC ID - Unique APIC ID for the APIC Bus Interface Unit. |

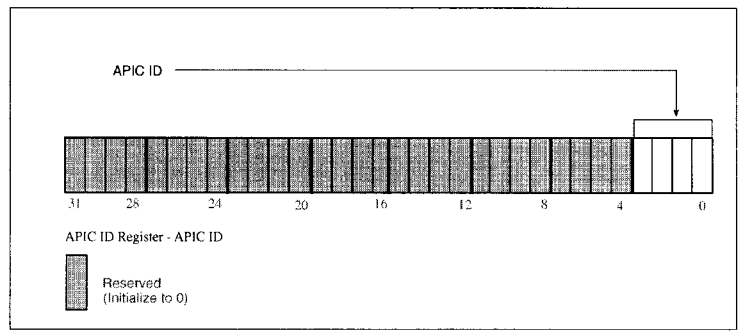

Figure 14-3. APIC ID Register - APID ID

14.3.2 APIC Arbitration Register - APIC ArbID

The APIC Arbitration Register (APIC ArbID) contains the current bus arbitration priority for the APIC Bus Interface Register. It is read-write to the 80960 JF processor but it is normally only written when the APIC ID Register is written. It must loaded with the new APIC ID value by the emulation software whenever APIC ID register is written. This register is valid only for those I/O APIC Units that are directly connected to the APIC bus. If the I/O APIC is not connected to the APIC bus, this register will always return the I/O APIC ID. A rotating priority scheme is used for APIC bus arbitration. The winner of the arbitration becomes the lowest priority agent and assumes an arbitration ID of 0.

Whenever an APIC bus message is successfully completed, all other agents, except the agent whose arbitration ID is 15, increment their arbitration IDs by one. The agent whose ID was 15 will take the winner's arbitration ID and will increment it by one. Arbitration IDs are changed (incremented or assumed) only for messages that are transmitted successfully (except in the case of Lowest Priority Local Unit messages where arbitration ID is changed even if message was not successfully transmitted). A message is transmitted successfully if no CS error or acceptance error was reported for that message. I/O APIC arbitration ID register is always loaded with I/O APIC ID during a "level triggered INIT with deassert" message.

Table 14-5. APIC Arbitration Register - APIC ArbID

| Bit | Default | Read/Write | Description |
|---|---|---|---|
| 31:04 | 0000000H | Read Only | Reserved |
| 03:00 | 0000$_2$ | Read/Write | APIC Arbitration ID - Current bus arbitration priority for the APIC Bus Interface Unit. |

APIC BUS INTERFACE U

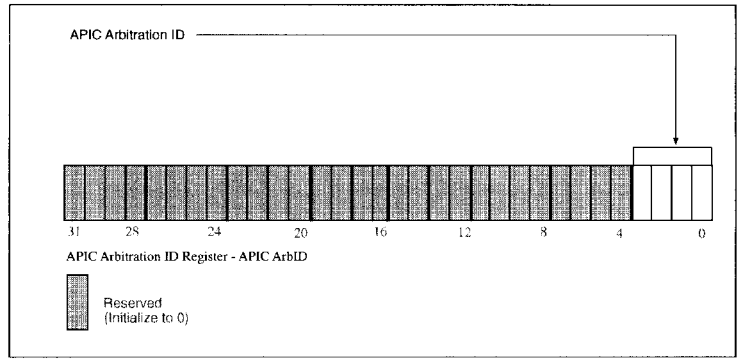

Figure 14-4. APIC Arbitration ID Register - APIC ArbID

14.3.3 EOI Vector Register - EVR

The EOI Vector Register is a read-write register although it will not be written by the emulation software in normal operation. It is set to the EOI Vector by the APIC Bus Interface Unit hardware when an EOI message is received on the APIC bus.

To insure that the value read is valid, the EOI Flow Control bit should be set and the EOI Received bit should indicate that an EOI has been received. If the EOI Flow Control bit is not set, another EOI could be received just as the EVR is being read resulting in corrupt read data. If the value of the EOI vector is not important then this is not an issue.

Table 14-6. EOI Vector Register - EVR

| Bit | Default | Read/Write | Description |
|---|---|---|---|
| 31:08 | 000000H | Read Only | Reserved |
| 07:00 | 00H | Read/Write | EOI Vector - EOI Vector received from the APIC Bus. |

APIC BUS INTERFACE UNIT

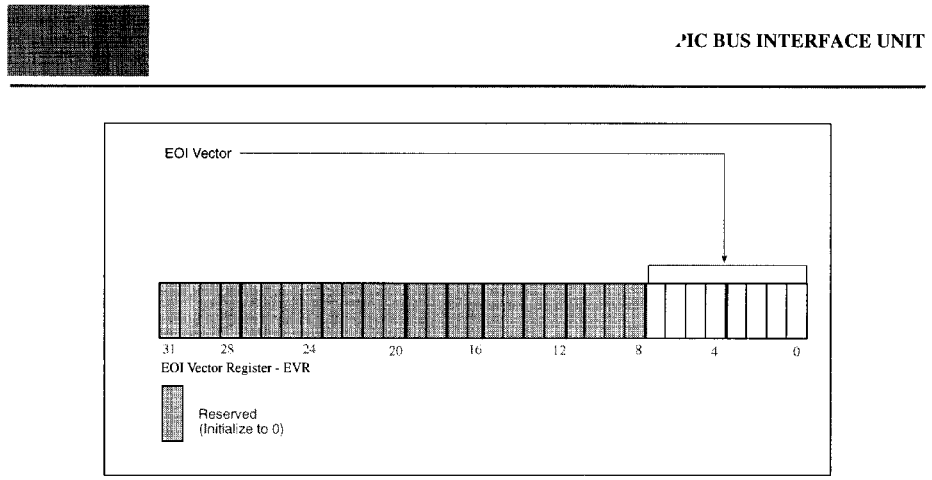

Figure 14-5. EOI Vector Register - EVR

14.3.4 Interrupt Message Register - IMR

The Interrupt Message Register is a 32-bit register used to provide the data to be sent in the APIC interrupt message. Figure 14-6 shows the definition of the bits of the IMR. The IMR fields have a 1-to-1 correspondence with the fields defined for the APIC Redirection Table entries and the bits sent in the APIC interrupt message itself. This register should only be written when the Send Message bit and Message Sent bit in the APIC CSR indicate that the APIC send unit is Idle (see Table 14-1). If the emulation software aborts a message by clearing the Send Message bit before the Message Sent bit is set, the emulation software should wait for at least 30 APIC clocks (1.8 ms at 16 MHz) before attempting to write a new value to the IMR.

Table 14-7. Interrupt Message Register - IMR

| Bit | Default | Read/Write | Description |
|---|---|---|---|
| 31:24 | 00H | Read/Write | Destination - contains an APIC ID or destination address. If the Destination Mode of this entry is Physical Mode, then the bits 27:24 contain an APIC ID. If Logical Mode, then the Destination field potentially defines a set of processors. Bits 31:24 of the Destination field specify the logical destination address. |
| 23:16 | 00H | Read Only | Reserved |
| 15 | $0_2$ | | Trigger Mode - indicates the type of signal on the interrupt pin that triggers an interrupt. A value of 0 means the input is edge sensitive and a value of 1 means the input is level sensitive. |
| 14 | $0_2$ | | Level - is only used if the Delivery Mode is set to INIT (101). If the Delivery Mode is not set to INIT, this bit must be set to 0. The meaning for INIT is:<br>• 0 - INIT De-asserted<br>• 1 - INIT Asserted |

APIC BUS INTERFACE UN...

Table 14-7. Interrupt Message Register - IMR

| Bit | Default | Read/Write | Description |
|---|---|---|---|
| 13 | $0_2$ | | Interrupt Input Pin Polarity - specifies the polarity of each interrupt signal connected to the interrupt pins of I/O APIC. A value of 0 means the signal is high active and a value of 1 means the signal is low active. |
| 12 | $0_2$ | Read Only | Reserved |
| 11 | $0_2$ | Read/Write | Destination Mode - determines the interpretation of the Destination field:<br>• 0 (Physical Mode): in Physical Mode, a destination APIC is identified by its ID. Bits 24 through 27 of the Destination field specify the 4-bit APIC ID.<br>• 1 (Logical Mode): in Logical Mode, destinations are identified by matching on Logical Destination under the control of the Destination Format Register and Logical Destination Register in each Local APIC. Bits 24 through 31 (8 MSB) of the Destination field specify the 8-bit APIC ID |
| 10:08 | $000_2$ | Read/Write | Delivery Mode- is a 3-bit field that specifies how the APICs listed in the destination field should act upon reception of this signal. Note that certain Delivery Modes will only operate as intended when used in conjunction with a specific Trigger Mode. These restrictions are indicated in the table below for each Delivery Mode.<br>• $000_2$ (Fixed): means deliver the signal on the INTR signal of all processor cores listed in the destination. Trigger Mode for "fixed" Delivery Mode can be edge or level.<br>• $001_2$ (Lowest Priority Local Unit): means deliver the signal on the INTR signal of the processor core that is executing at the lowest priority among all the processors listed in the destination. Trigger Mode for "lowest priority" Delivery Mode can be edge or level.<br>• $010_2$ (SMI): means System Management Interrupt. A delivery mode equal to "SMI" requires an "edge" Trigger mode. The vector information is ignored but must be programmed to all zeroes for future compatibility.<br>• $100_2$ (NMI): means deliver the signal on the NMI signal of all processor cores listed in the destination, vector information is ignored. "NMI" is treated as an "edge" triggered interrupt even if it is programmed as a "level" triggered interrupt.<br>• $101_2$ (INIT): means deliver the signal to all processor cores listed in the destination by asserting the INIT signal. All addressed local APICs will assume their INIT state. INIT is always treated as an "edge" Triggered interrupt even if programmed otherwise.<br>• $111_2$ (ExtINT): means deliver the signal to the INTR signal of all processor cores listed in the destination as an interrupt that originated in an externally connected (8259A-compatible) interrupt controller. The INTA cycle that corresponds to this ExtINT delivery will be routed to the external controller that is expected to supply the vector. A Delivery Mode of "ExtINT" requires an "edge" Trigger Mode. |
| 07:00 | 00H | Read/Write | Vector - is the interrupt vector for this interrupt. Vector values range between 10H and FEH. |

APIC BUS INTERFACE UNIT

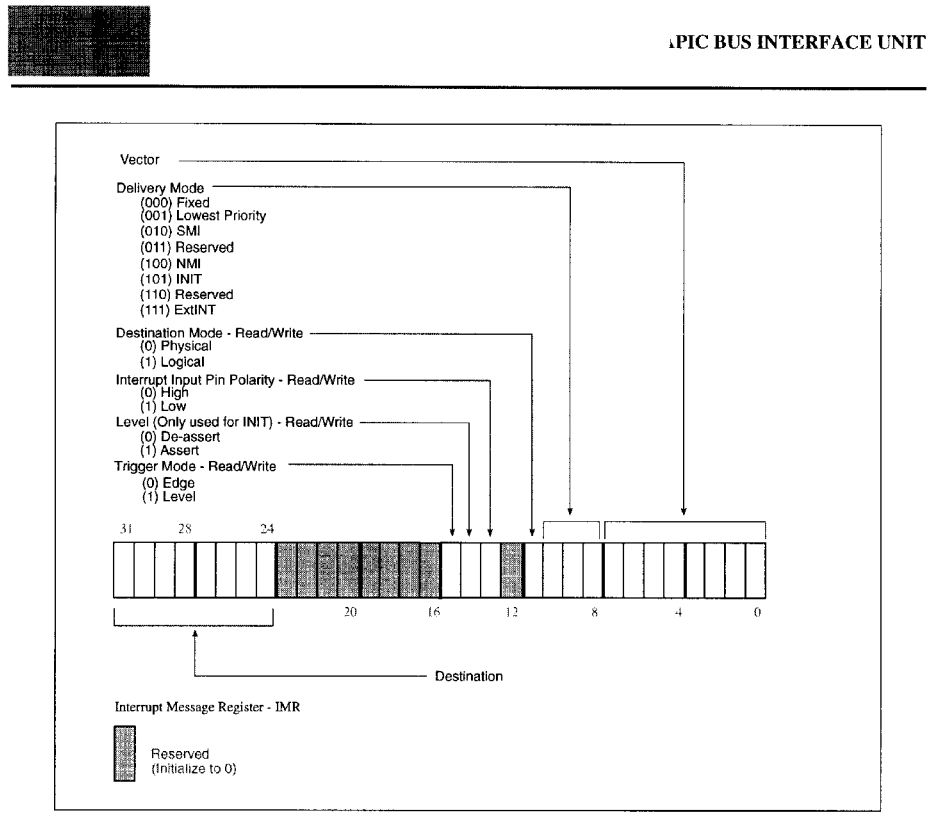

Figure 14-6. Interrupt Message Register - IMR

14.3.5 APIC Control/Status Register - APIC CSR

The APIC Control/Status Register (APIC CSR) is used to control and monitor the status of the APIC Bus Interface Unit. The lower byte is used for sending APIC interrupt messages and the upper byte is used for receiving APIC EOI messages. The register is shown in Figure 14-7.

APIC BUS INTERFACE UN_

Table 14-8. APIC Control/Status Register

| Bit | Default | Read/Write | Description |
|---|---|---|---|
| 31:16 | 0000H | Read Only | Reserved |
| 15 | $0_2$ | Read/Write | EOI Flow Control - determines whether or not to accept an EOI message from the APIC bus. When this bit is cleared, the APIC Bus Interface Unit will always accept an EOI message. When it is set, the unit will wait for the 80960 JF processor to process the previous EOI before accepting another. See Table 14-3 for more details. |
| 14 | $0_2$ | Read/Clear | EOI Received - is used to indicate that an APIC EOI message has been received. This is a read/clear bit. |
| 13 | $0_2$ | Read/Write | EOI Interrupt Enable - is used to enable an 80960 JF processor interrupt to be generated when the EOI Received bit is active. When this bit is cleared, an APIC EOI will not interrupt the 80960 JF processor. |
| 12 | $0_2$ | Read/Write | APIC Bus Interface Enable - is used to control the pin multi-plexers for the APIC bus pins. If this bit is cleared, the APIC pins are not visible to the outside world. If it is set, the APIC bus of this unit is connected to the pins of the P2P processor. |
| 11:08 | $0000_2$ | Read Only | Reserved |
| 07 | $0_2$ | Read/Write | Send Message - is used to tell the APIC Bus Interface Unit to take the information in the IMR and send an interrupt message on the APIC bus. The APIC Bus Interface will attempt to send a message whenever this bit is set and the Message Sent bit is reset. |
| 06 | $0_2$ | Read/Clear | Message Sent - is used to indicate that the APIC interrupt message has been sent. To insure that it was received by a local APIC, the status field must be checked. |
| 05 | $0_2$ | Read/Write | Message Sent Interrupt Enable - is used to enable an 80960 JF processor interrupt to be generated when the Message Sent bit is active. When this bit is cleared, the APIC Bus Interface will not interrupt the 80960 JF processor after the message has been sent. |
| 04:00 | 00H | Read/Write | APIC Message Status - are read/write for testability but are normally just set by the APIC Bus Interface after sending an APIC interrupt message. Bits 3:2 are Status0 and bits 1:0 are Status1. Bit 4 is set if there was an error on Status2 during a lowest priority local unit arbitration message. It is cleared for all other messages. See Table 14-2 for complete details. |

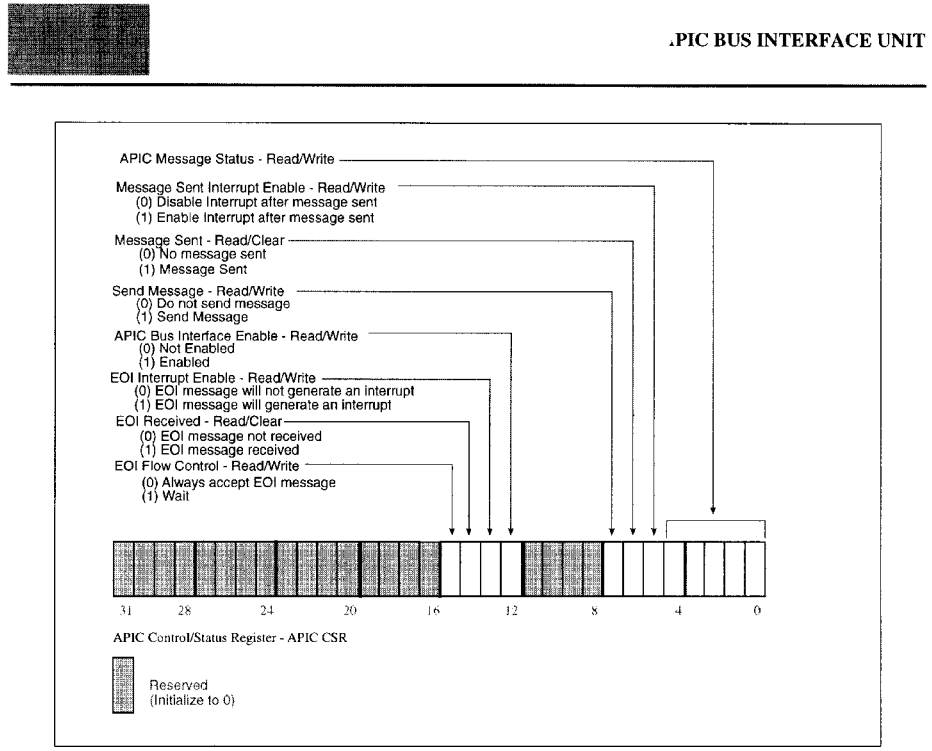

Figure 14-7. APIC Control/Status Register - APIC CSR

14.4 APIC BUS PROTOCOL

This section describes the APIC bus protocol. The APIC Bus Interface requires 3 signal pins. There are two data pins, PICD, and one clock input, PICCLK.

14.4.1 Physical Characteristics of APIC

The APIC bus is a 3-wire synchronous bus connecting all APICs (all I/O units and all local units). Two of these wires are used for data transmission, and one wire is a clock. For bus arbitration, the APIC uses only one of the data wires.

The bus is logically a wire-OR and electrically an open-drain connection providing arbitration for both bus use and for lowest priority interrupt delivery. Being open-drain, the bus is run at a "comfortable" speed such that design-specific termination tuning is not required. Furthermore, each APIC receiving a message or participating in an arbitration must be given enough time in a single bus cycle to latch the bus and perform some simple logic operations on the latched information in order to determine whether the next drive cycle must be inhibited. The maximum APIC bus speed is 16 MHz.

All the values mentioned in the protocol description are logical values; i.e. "Bus Driven" is logical 1 and "Bus Not Driven" is logical 0. The electrical values are 0 for logical one and 1 for logical zero.

APIC BUS INTERFACE U<sub>1</sub> 

14.4.2 Arbitration for APIC Bus

The APIC uses one wire arbitration to win the bus ownership. A rotating priority scheme is used for APIC bus arbitration. The winner of the arbitration becomes the lowest priority agent and assumes an arbitration ID of 0. All other agents, except the agent whose arbitration ID is 15, increment their arbitration IDs by one. The agent whose ID was 15 will take the winner's arbitration ID and will increment it by one. arbitration IDs are changed (incremented or assumed) only for messages that are transmitted successfully (except for the Low Priority messages). A message is transmitted successfully if no CS error or acceptance error was reported for that message.

Table 14-9. APIC Bus Arbitration

| Cycle | Bit1 | Bit0 | Comments |
|---|---|---|---|
| 1: | eoi | 1 | 01 = normal, 11 = EOI |
| 2: | ArbID3 | 0 | Arbitration ID bits 3 through 0 |
| 3: | ArbID2 | 0 | |
| 4: | ArbID1 | 0 | |
| 5: | ArbID0 | 0 | |

An APIC agent can acquire the bus using two different priority schemes; normal, or EOI. EOI has the highest priority. EOI priority is used to send EOI messages for level interrupts from local APIC to I/O APIC. When an agent requests the bus with EOI priority all others requesting the bus with normal priorities back off. The APIC Bus Interface Unit is not capable of sending EOI messages and therefore, will always arbitrate with eoi=0.

A bus arbitration cycle is shown in Table 14-9. It starts with the agent driving a start cycle (bit1 = eoi, bit0 = 1)on the APIC bus. Bit1=1 indicates "EOI" priority and bit1 = 0 indicates normal priority. Bit0 should be 1.

Cycle 2 through 5, the agent drives the arbitration ID on to the bus. High-order ID bits are driven first, successive cycles proceeding to the low bits of the ID. All losers in a given cycle drop off the bus, using every subsequent cycle as a tie breaker for the previous cycle. By the time all arbitration cycles are completed, there will be only one agent left driving the bus.

14.4.3 Lowest-Priority Local Unit Arbitration

The I/O unit never participates in lowest-priority Local Unit arbitration but a short description is included here for completeness. Arbitration is also used to find the local APIC unit with the lowest processor priority. Lowest-priority (LP) arbitration uses the value of the APIC's Processor Priority value appended with an 4-bit Arbitration ID to break ties in case there are multiple APICs executing at the lowest priority. All 8 bits of the Processor Priority Register are used for LP arbitration.

14.4.4 Bus Message Formats

After bus arbitration, the winner is granted exclusive use of the bus and will drive its actual message on the bus. APIC messages come in four formats: 14 cycle EOI message, 21 cycle Short message, 33 cycle Lowest Priority Local Unit message and 39 cycle Remote Read message (not shown here because it is always between two Local APICs). All APICs on the APIC bus know the length of an interrupt message by checking the appropriate fields in the message.

14.4.4.1 EOI Message For Level Triggered Interrupts

EOI message is used to send an EOI cycle occurring for a level triggered interrupt from local APIC to I/O APIC. It contains the priority vector (V7 through V0) of the interrupt. Upon receiving this message, the I/O APIC resets the

 'IC BUS INTERFACE UNIT

Remote IRR bit for that interrupt. If the interrupt signal is still active after the IRR bit is reset, the I/O APIC will treat it as a new interrupt.

Table 14-10. APIC Bus EOI Message

| Cycle | Bit1 | Bit0 | Comments |
|---|---|---|---|
| 1: | 1 | 1 | 01 = normal, 11 = EOI |
| 2: | ArbID3 | 0 | Arbitration ID bits 3 through 0 |
| 3: | ArbID2 | 0 | |
| 4: | ArbID1 | 0 | |
| 5: | ArbID0 | 0 | |
| 6: | V7 | V6 | Interrupt vector V7 - V0 |
| 7: | V5 | V4 | |
| 8: | V3 | V2 | |
| 9: | V1 | V0 | |
| 10: | C | C | Check Sum |
| 11: | 0 | 0 | Postamble |
| 12: | A | A | Status Cycle0 |
| 13: | A1 | A1 | Status Cycle1 |
| 14: | 0 | 0 | Idle |

The APIC Bus Interface Unit cannot send an EOI message but will receive any EOI messages from the APIC bus and write the vector to the EVR. It then sets the EOI Received bit in the APIC CSR and interrupts the 80960 JF processor if enabled by the EOI Interrupt Enable bit in the APIC CSR. The unit will then wait for the EOI Received bit to be cleared before accepting any more EOI messages. This flow control mechanism can be disabled by clearing the EOI Flow Control bit in the APIC CSR. If an EOI message is received when the EOI Received bit and EOI Flow Control bit are both set, the I/O APIC Interface unit will drive a *Retry* Status during Status Cycle 1 ('11' - See Table 14-2).

14.4.4.2 Short Message

A short interrupt message is sent when the Send Message bit in the APIC CSR is set, the Message Sent bit is reset and the delivery mode specified in the IMR (M2-M0) is Fixed, NMI, SMI, Reset, ExtINT or Lowest Priority with Focus processor interrupts. Once the message has been sent, the Message Sent bit in the APIC CSR is set and the 80960 JF processor is interrupted if the Message Sent Interrupt Enable bit is set. All short messages take 21 cycles including the idle cycle. If the Send Message bit is cleared before the unit has sent the message, the I/O APIC Bus Interface will not try to arbitrate for the bus until the Send Message bit is once again set. The ArbID bits are taken from the Arbitration ID register and the rest of the information sent by the APIC bus interface is taken from the IMR.

Table 14-11. APIC Bus Short Message

| Cycle | Bit1 | Bit0 | Comments |
|---|---|---|---|
| 1: | 0 | 1 | 01 = normal, 11 = EOI |
| 2: | ArbID3 | 0 | Arbitration ID bits 3 through 0 |
| 3: | ArbID2 | 0 | |
| 4: | ArbID1 | 0 | |
| 5: | ArbID0 | 0 | |
| 6: | DM | M2 | DM = Destination mode |

APIC BUS INTERFACE U.

Table 14-11. APIC Bus Short Message

| | | | |
|---|---|---|---|
| 7: | M1 | M0 | M2-M0 = Delivery mode |
| 8: | L | TM | L = Level, TM = Trigger Mode |
| 9: | V7 | V6 | V7-V0 = Interrupt Vector |
| 10: | V5 | V4 | |
| 11: | V3 | V2 | |
| 12: | V1 | V0 | |
| 13: | D7 | D6 | Destination |
| 14: | D5 | D4 | |
| 15: | D3 | D2 | |
| 16: | D1 | D0 | |
| 17: | C | C | Check Sum |
| 18: | 0 | 0 | Postamble |
| 19: | A | A | Status Cycle0 |
| 20: | A1 | A1 | Status Cycle1 |
| 21: | 0 | 0 | Idle |

Cycles 1 is the start cycle. Cycles 2 through 5 are for bus arbitration as described earlier. APIC ID bits are sent on the bus one bit at a time. Only one data bus bit is used for this. The other bit should be zero.

Cycles 6 and 7 together give Destination mode and Delivery mode bits. Cycle 8 give Level and Trigger mode information.

Cycles 9 through 12 are the 8-bit interrupt vector. The vector is only defined for Delivery Modes Fixed, and Lowest-priority. For Delivery Mode of "Remote Read", the vector field contains the address of the register to be read remotely (not supported by the P2P processor).

If DM is 0 (physical mode), then cycles 15 and 16 are the APIC ID and cycles 13 and 14 are zero. If DM is 1 (logical mode), then cycles 13 through 16 are the 8-bit Destination field. The interpretation of the logical mode 8-bit Destination field is performed by the local units using the Destination Format Register.

Cycle 17 is a checksum over the data in cycles 6 through 16. This field is the cumulative add (mod 4) of all data bits (DM, M0-3, L, TM, V0-7,D0-7). The (single) APIC driving the message provides this checksum in cycle 17.

Cycle 18 is a postamble cycle driven as '00' by all APICs to perform various internal computations based on the information contained in the received message. One of the computations takes the computed checksum of the data received in cycles 6 through 16 and compares it against the value in cycle 18. If any APIC computes a different checksum than the one passed in cycle 17, then that APIC will signal an error on the APIC bus in cycle 19 by driving it as '11'. If this happens, all APICs will assume the message was never sent and the sender must try sending the message again, which includes re-arbitrating for the APIC bus. In lowest priority delivery when the interrupt has a focus processor, the focus processor will signal this by driving '10' during cycle 19. This tells all the other APICs that the interrupt has been accepted, the arbitration is preempted, and short message format is used. Cycle 19 and 20 indicates the status of the message, i.e. accepted, check sum error, retry or error. Table 14-2 shows the status signals combinations and their meanings for all delivery modes.

14.4.4.3  Lowest Priority Local Unit Message

This message is sent when the Send Message bit in the APIC CSR is set, the Message Sent bit is reset and the delivery mode specified in the IMR (M2-M0) is Lowest Priority Local Unit. Once the message has been sent, the Message Sent bit in the APIC CSR is set and the 80960 JF processor is interrupted if the Message Sent Interrupt Enable bit is set. If the Send Message bit is cleared before the unit has sent the message, the I/O APIC Bus Interface will not try to arbitrate for the bus until the Send Message bit is once again set. The ArbID bits are taken from the Arbitration ID register and the rest of the information sent by the APIC bus interface is taken from the IMR.

APIC BUS INTERFACE UNIT

Cycles 1 through 21 for this message is same as for the short message discussed above. Status cycle 19 identifies if there is a Focus processor (10) and a status value of '11' in cycle 20 indicates the need for lowest priority arbitration.

Cycle 21 through 28 are used to arbitrate for the lowest priority processor. The processor which take part in the arbitration drive their processor priority on the bus. Only the local APICs which have "free interrupt slots" will participate in the lowest priority arbitration.

Cycle 29 through 32 are used to break tie in case two more processors have lowest priority. The bus arbitration ID's are used to break the tie. Cycle 34 is an idle cycle.

Table 14-12. APIC Bus Short Message

| Cycle | Bit1 | Bit0 | Comments |
|---|---|---|---|
| 1: | 0 | 1 | 01 = normal, 11 = EOI |
| 2: | ArbID3 | 0 | Arbitration ID bits 3 through 0 |
| 3: | ArbID2 | 0 | |
| 4: | ArbID1 | 0 | |
| 5: | ArbID0 | 0 | |
| 6: | DM | M2 | DM = Destination mode |
| 7: | M1 | M0 | M2-M0 = Delivery mode |
| 8: | L | TM | L = Level, TM = Trigger Mode |
| 9: | V7 | V6 | V7-V0 = Interrupt Vector |
| 10: | V5 | V4 | |
| 11: | V3 | V2 | |
| 12: | V1 | V0 | |
| 13: | D7 | D6 | Destination |
| 14: | D5 | D4 | |
| 15: | D3 | D2 | |
| 16: | D1 | D0 | |
| 17: | C | C | Check Sum |
| 18: | 0 | 0 | Postamble |
| 19: | A | A | Status Cycle0 |
| 20: | A1 | A1 | Status Cycle1 |
| 21: | P7 | 0 | Inverted Processor Priority P7 - P0 |
| 22: | P6 | 0 | |
| 23: | P5 | 0 | |
| 24: | P4 | 0 | |
| 25: | P3 | 0 | |
| 26: | P2 | 0 | |
| 27: | P1 | 0 | |
| 28: | P0 | 0 | |
| 29: | ArbID3 | 0 | Arbitration ID 3 -0 |

APIC BUS INTERFACE U
Table 14-12. APIC Bus Short Message
| 30: | ArbID2 | 0 | |
|---|---|---|---|
| 31: | ArbID1 | 0 | |
| 32: | ArbID0 | 0 | |
| 33: | A2 | A2 | Status (10 means status OK, other values indicate an error) |
| 34: | 0 | 0 | Idle |

What is claimed is:

1. In a computer system having a host processor containing a local advanced programmable interrupt controller (APIC), a host chipset connected to the host processor by a host bus, and an input/output (I/O) subsystem connected to the host chipset by a primary PCI bus and connected to a set of I/O devices by a secondary PCI bus, a method comprising:

connecting the interrupt lines of the I/O devices directly to the I/O subsystem;

connecting an APIC bus directly from the I/O subsystem to the local APIC of the host processor;

emulating I/O APIC operations within an intelligent processor of the I/O subsystem;

providing an interrupt controller within the I/O subsystem, for receiving at its input non-PCI interrupt signals and PCI interrupt signals and providing to said intelligent processor for processing said non-PCI interrupt signals and PCI interrupt signals; and providing a set of multiplexers receiving at its input non-PCI interrupt signals and PCI interrupt signals and selectively directing said non-PCI interrupt signals and PCI interrupt signals to one of said interrupt controller and said primary PCI bus according to a selection signal from said intelligent processor.

2. The method according to claim 1 further comprising the steps of:

configuring a memory to include a redirection table.

3. The method according to claim 1 further comprising the step of:

configuring said memory to include non-host visible advanced programmable interrupt controller (APIC) registers.

4. The method according to claim 1 further comprising the step of:

utilizing a pair of registers within a messaging unit of said I/O subsystem to implement an advanced programmable interrupt controller (APIC) register select register and an APIC window register.

5. A computer system comprising:

a host processor containing a local advanced programmable interrupt controller (APIC);

a host chipset connected to the host processor by a host bus;

an input/output (I/O) subsystem connected to the host chipset by a primary PCI bus and connected to the local APIC of the host processor by an APIC bus;

an I/O processor provided within the I/O subsystem, for receiving APIC interrupt signals from I/O devices, emulating APIC functionality, and communicating with the local APIC of the host processor over the APIC bus;

an interrupt controller provided within the I/O subsystem, for receiving at its input non-PCI interrupt signals and PCI interrupt signals and providing to said I/O processor for processing said non-PCI interrupt signals and PCI interrupt signals; and a set of multiplexers receiving at its input non-PCI interrupt signals and PCI interrupt signals and selectively directing said non-PCI interrupt signals and PCI interrupt signals to one of said interrupt controller and said primary PCI bus according to a selection signal from said I/O processor.

6. The computer system according to claim 5 further comprising a memory device including a redirection table.

7. The computer system according to claim 6 wherein said memory device further including a non-host visible advanced programmable interrupt controller (APIC) registers.

8. The computer system according to claim 5 further comprising a pair of registers within a messaging unit of said I/O subsystem to implement an advanced programmable interrupt controller (APIC) register select register and an APIC window register.

9. A computer system comprising:

a host platform;

a PCI expansion box having a plurality of expansion slots for I/O devices;

a PCI bus interconnecting the host platform and the PCI expansion box;

an I/O processor running an emulation program, within the PCI expansion box, for receiving non-PCI interrupt signals from the I/O devices of the expansion slots, for encoding the non-PCI interrupts as PCI data signals, and for forwarding the encoded non-PCI interrupts to the host platform over the PCI bus;

an interrupt controller provided within the PCI expansion box, for receiving at its input non-PCI interrupt signals and providing to said I/O processor for processing said non-PCI interrupt signals;

a set of multiplexers receiving at its input non-PCI interrupt signals and PCI interrupt signals and selectively directing said non-PCI interrupt signals and PCI interrupt signals to one of said interrupt controller and said primary PCI bus according to a selection signal from said I/O processor; and a host processor within the host platform, for receiving and decoding the encoded non-PCI interrupt data signals and for converting those signals to advanced programmable interrupt controller (APIC) interrupt signals.

10. A computer system comprising:

a host platform;

a PCI expansion box having a plurality of expansion slots for I/O devices;

a PCI bus interconnecting the host platform and the PCI expansion box;

an advanced programmable interrupt controller (APIC) bus interconnecting the host platform and the PCI expansion box;

an I/O Processor running an APIC emulation program within the PCI expansion box, for receiving non-PCI interrupts from the I/O devices, for converting the interrupts to APIC interrupts, and for forwarding the APIC interrupts over the APIC bus;

an interrupt controller provided within the PCI expansion box, for receiving at its input non-PCI interrupt signals and providing to said I/O processor for processing said non-PCI interrupt signals;

a set of multiplexers receiving at its input non-PCI interrupt signals and PCI interrupt signals and selectively directing said non-PCI interrupt signals and PCI interrupt signals to one of said interrupt controller and said primary PCI bus according to a selection signal from said I/O processor; and an host processor having a local APIC within the host platform, for receiving and processing the APIC interrupts forwarded over the APIC bus.

* * * * *